(12) United States Patent
Zhao (10) Patent No.: US 10,435,037 B2
(45) Date of Patent: Oct. 8, 2019

(54) HIGH-CARRYING-CAPACITY NON-STOP RAIL TRANSIT SYSTEM

(71) Applicant: Yi Zhao, Shanghai (CN)

(72) Inventor: Yi Zhao, Shanghai (CN)

( * ) Notice: Subject to any disclaimer, the term of this patent is extended or adjusted under 35 U.S.C. 154(b) by 224 days.

(21) Appl. No.: 15/363,889

(22) Filed: Nov. 29, 2016

(65) Prior Publication Data

US 2017/0080953 A1 Mar. 23, 2017

Related U.S. Application Data

(63) Continuation-in-part of application No. PCT/CN2015/080199, filed on May 29, 2015.

(30) Foreign Application Priority Data

May 30, 2014 (CN) .......................... 2014 1 0239876

(51) Int. Cl.
 *B61B 15/00* (2006.01)
 *B61B 1/00* (2006.01)
 (Continued)

(52) U.S. Cl.
 CPC ............... *B61B 15/00* (2013.01); *B61B 1/00* (2013.01); *B61B 3/00* (2013.01); *B61B 10/02* (2013.01);
 (Continued)

(58) Field of Classification Search
 CPC ......... B61B 10/02; B61B 13/00; B61B 15/00; B61B 1/00; B61B 3/00; B61L 27/0077;
 (Continued)

(56) References Cited

U.S. PATENT DOCUMENTS

| 3,769,913 A | * | 11/1973 | McRae, Jr. | ............. B61B 13/00 104/18 |
| 3,929,076 A | | 12/1975 | McRae, Jr. et al. | |

(Continued)

FOREIGN PATENT DOCUMENTS

| AU | 2015266445 A1 | 1/2017 |
| CA | 2950639 A1 | 11/2016 |

(Continued)

OTHER PUBLICATIONS

English Translation of International Search Report for PCT/CN2015/080199 dated Aug. 6, 2015.

(Continued)

*Primary Examiner* — Mark T Le
(74) *Attorney, Agent, or Firm* — Christopher M. Scherer; DeWitt LLP (57) ABSTRACT

A high-carrying-capacity non-stop rail transit system, wherein, comprising a main passage, a main rail arranged in the main passage, an exit and entrance passage and independent small compartments, wherein, the independent small compartment is provided with a connecting device, the exit and entrance passage is provided with a rail change structure, the connecting device realizes transfer and rail change between the main passage and the exit and entrance passage through the rail change structure, the main rail is used to place the independent small compartment and drive the independent small compartment to move. The system adopts the independent small compartment mode, so every passenger has a seat and the non-stop purpose is realized; stable and continuous kinetic energy for advancing are provided; and the independent small compartments have no relative displacement and can reach a high speed under high density.

33 Claims, 8 Drawing Sheets

(51) Int. Cl.
  *B61B 3/00* (2006.01)
  *B61L 27/00* (2006.01)
  *B61B 10/02* (2006.01)
  *B61B 13/00* (2006.01)

(52) U.S. Cl.
  CPC .......... *B61B 13/00* (2013.01); *B61L 27/0077* (2013.01); *Y02T 30/30* (2013.01)

(58) Field of Classification Search
  CPC ............. B61B 15/0072; B61L 27/0094; B61L 27/0027; Y02T 30/30
  USPC ............................................ 104/88.03, 88.04
  See application file for complete search history.

(56) References Cited

U.S. PATENT DOCUMENTS

| | | | |
|---|---|---|---|
| 4,057,017 A | | 11/1977 | Michalon |
| 4,425,851 A | * | 1/1984 | Long ........................ B61B 15/00 104/122 |
| 4,791,871 A | * | 12/1988 | Mowll ....................... B60L 5/40 104/88.02 |
| 4,840,124 A | * | 6/1989 | Tadashima .............. D01H 9/182 104/163 |
| 5,005,487 A | * | 4/1991 | Ohmura .............. B05B 13/0221 104/292 |
| 5,289,778 A | * | 3/1994 | Romine ................... B60F 1/043 104/124 |
| 5,775,227 A | * | 7/1998 | Mullen ................. B30B 15/304 104/244 |
| 6,311,102 B1 | | 10/2001 | Minakami |
| 7,871,234 B2 | * | 1/2011 | Yuyama ............... A61G 12/001 280/33.997 |
| 2009/0235839 A1 | | 9/2009 | Stahn |
| 2010/0043665 A1 | | 2/2010 | Brigham |

FOREIGN PATENT DOCUMENTS

| | | |
|---|---|---|
| CN | 101432177 | 5/2009 |
| CN | 101628583 | 1/2010 |
| CN | 101722955 | 6/2010 |
| CN | 101722955 A | 6/2010 |
| CN | 102328660 | 1/2012 |
| CN | 104015731 A | 9/2014 |
| CN | 104908753 A | 9/2015 |
| DE | 1755794 A | 6/1971 |
| EP | 2199172 A2 | 6/2010 |
| IN | 201627042196 A | 1/2017 |
| JP | H02-175463 A | 7/1990 |
| JP | H03-16870 A | 1/1991 |
| JP | H07-172298 A | 7/1995 |
| JP | H09-240466 A | 9/1997 |
| JP | 2008280030 | 11/2008 |
| JP | 2010-47243 A | 3/2010 |
| KR | 20170012488 A | 2/2017 |
| RU | 2220063 | 12/2003 |
| RU | 2249517 | 4/2005 |
| RU | 2413640 | 3/2011 |
| RU | 2433928 | 11/2011 |
| SG | 11201609996P A | 1/2017 |

OTHER PUBLICATIONS

Written Opinion for PCT/CN2015/080199 dated Aug. 6, 2015.
First Office Action from the Chinese counterpart patent application CN201510287528.6 dated Jan. 4, 2017.
Bianchongyu(Yi Zhao), "Subway Taxi—idea and design", Rail Transit, 2014,vol. 5, pp. 54-56 and English translation of its relevant parts (i.e. the Abstract and Part I to Part V ).
EESR of Counterpart European Application 15798826.2 dated Jul. 3, 2017.
The First Examination Report of Australian Application 2015266445 dated Aug. 7, 2018.
International Search Report for PCT/CN2015/080199 dated Jul. 15, 2015.
Office Action issued in Russian Patent Application No. 2016152284 dated Jan. 18, 2019.
Notification of Reasons for Refusals issued in Japanese patent application No. 2016-571060 dated Apr. 9, 2019.

* cited by examiner

HIGH-CARRYING-CAPACITY NON-STOP RAIL TRANSIT SYSTEM

FIELD OF INVENTION

The present invention relates to the technical field of city and inter-city transport, in particular to a public transport method for people or cargo, and a rail transit system formed by the related transport infrastructure.

PRIOR ARTS

At present, the life quality of human is deeply affected by the quality of transport, especially city transport. In the "Report on China's new urbanization in 2010" issued by Chinese Academy of Sciences, Beijing ranks at the top of time-consumption on the way to work with "average 52 minutes". The carrying-capacity, time-consumption and comfort level of the transport in a city have a profound impact on competitiveness and development potential of the city. The blocked and poor comfortable public transport will stimulate the increase of the purchase of private cars, which in turn affect the entire road transport, as well as fuel the city's fog, so a fundamental solution to the city public transport has a great significance.

In the transport time, because public transport is centralized transport, passengers have various destinations, resulting in public transport must stop at every station, wherein the docking time, door switch time, and acceleration and deceleration time have caused tremendous time-waste. According to the calculation by the author in Shanghai, the ratio of operating time and stop time between two stations of the subway is about 1:1, that is to say, the unnecessary time-consumption caused because every station must stop accounts for 50% of the entire traffic time-consumption.

According to Downs-Thomas paradox, the time-consumption extension of city public transport will also affect the congestion of road traffic, resulting in city traffic complication, according to the search report of Beijing transport Development Research Center, in 2011, city traffic congestion of Beijing caused a loss of 105.6 billion yuan, equivalent to a loss of 7.5% of Beijing's GDP.

Every station must stop requires door switch time-consumption, loading and unloading time-consumption, and before stopping it is required to brake and still, and after stopping it is required to restart . . . , a subway arrives at a station, perhaps only 10% of the people get on or off, the rest 90% of people need to undertake, how unreasonable! Such as Beijing, Shanghai, more than 20 million passengers per year on subway commuter trips, the price is amazing.

And each time of brake and start, also increase plenty of wear and energy consumption.

Not only that, subway station is crowded, waiting time is long, transfer is inconvenient, various disadvantages are obvious. In 2014, Shanghai Metro has 14 lines running, but the transfer among the lines is extremely inconvenient, inconvenient transfer has become a general situation of city subway in the word, reducing the efficiency of city transport.

These city transport problems are derived from the use of the centralized mode of "people are centralized to be transported", because people need to be centralized, it must be people waiting for the car; because everyone gets off at different point, every station must stop; because the transfer needs of passengers are different, the passengers need to get off to transfer, resulting in transfer difficult; because you can only be sent to a fixed centralized zone, the last mile problem will be caused.

Modern city transport problem is already a worldwide problem, the fundamental reason is because of this old mode of centralized transport, for example: the present transport mode of the subway has not changed for 150 years since its inception. With regard to the design and improvement of city public transport, most of the work of mankind in the past remained in the improvement of the transport tools and road traffic, while the improvement of the transport mode is very limited.

At home and abroad, neither the bus rapid transit (BRT) nor automated people move (APM) or the empty rail mode has left the scope of the centralized transport mode. What is really innovative is: the personal rapid transit (PRT) mode, American Virginia Airport and the United Kingdom Heathrow Airport have built related systems.

In the PRT, small compartment mode is used, relying on unmanned drive to basically realize non-stop purpose, this is its advantage, but the lack of overall transport capacity is a fatal disadvantage, such as the new Heathrow Airport PRT built in 2011, its transport capacity is about 40,000 passengers per day, and this is just the commute of 1 hour at peak station in Shanghai subway station, because the transport capacity is too small, this new transport mode cannot become the protagonist of city transport, and more as a sightseeing and leisure transport mode.

As a result, city public transport falls into a contradiction: the transport system having high-carrying-capacity cannot meet the humanity needs of passenger, but the overall carrying-capacity of the transport system which could meet the humanity needs is too small.

The aim of the invention is to solve the contradiction and realize the high-carrying-capacity at the same time of completing non-stop purpose, saving the unnecessary waiting time and other human needs.

The key to the failure of the personal rapid transit system (PRT) to achieve high capacity is: 1. Due to the traditional vehicle kinetic energy mode (corresponding to the rail kinetic energy of the present invention), since the small vehicles are operated independently, for safety, large distance must be maintained for high speed operation, and lower speed must be taken if keeping smaller distance, both cases will cause the low-carrying-capacity of the entire rail. It is best to simultaneously maintain high density and high speed to achieve high-carrying-capacity. 2. In addition to the above, the problem of rapid rail change (transfer) of vehicle also needs to address under the condition of high-density, in the "next world-high speed train 1" of DISCOVERY channel, establishment of rapid rail change system is listed in the problems which must be solved in order to build a new large-scale rapid transit network.

The present invention utilizes the rail kinetic energy, and the independent small compartment placed on it utilize carrying mode to realize the advancement, since each independent small compartment maintains the same direction and the same speed, that is, there is no relative displacement between the independent small compartments, the driving is more secure, and more importantly: the independent small compartment running in said system can reach a high speed under high density, and the use of stereo rail change method assists to solve the problem of rapid rail change, the use of the exit and entrance rail connecting the power rail with the off-line type station solves the problem of the exit and entrance, the combination of the foregoing realize the transport of non-stop purpose, and simultaneously the whole rail has a higher-carrying-capacity.

CONTENT OF THE PRESENT INVENTION

In view of the above contents, the purpose of the present invention is to provide a public transport method and related device that can realize non-stop purpose and has an overall high-carrying-capacity.

To achieve the above purpose, a high-carrying-capacity non-stop rail transit system is designed, said system comprises a main passage, operating compartments, an exit and entrance passage, rails, and a station, wherein the operating compartments are independent small compartments, the rails are laid in the main passage and are power rails that keep moving at a constant speed, the independent small compartments are placed at corresponding positions on the power rails, and the power rails drive the independent small compartments to advance at a constant speed; the station is connected to the main passage having the power rails through the exit and entrance passage, one end of the exit and entrance passage is connected with ground platform and the other end of the exit and entrance passage is connected with the main passage to form a communicated structure, a connecting device is provided at the top of each independent small compartment, and the connecting device and a connecting structure arranged above the exit and entrance passage are butt-joined to complete rail change.

The power rails move at a constant speed may be replaced with move in cycle, independent small compartments are replaced on the power rail, providing main forward power; one end of the exit and entrance passage is connected with ground platform and the other end of the exit and entrance passage is connected with the main passage may be replaced with one end of the exit and entrance passage is connected with the station and the other end of the exit and entrance passage is connected with the main passage; main rail is laid in the main passage, exit and entrance rail is laid in the exit and entrance passage, the station is off-line type station, the off-line type station is connected to the main rail through the exit and entrance rail; the connecting device provided at the top of independent small compartment is rail change connector, the connecting structure arranged above the exit and entrance passage is top rail, the rail change connector on the independent small compartment changes to butt joint with the top rail to complete stereo rail change.

Main rail (power rail) part: the power rail could change the power system from vehicle carrying to rail carrying, i.e. an integral power rail structure formed by combination of the traditional rail and related power device, the power rail can form steady movement at a constant speed, independent small compartments are placed on it, to realize the purpose of advancement.

The power source of the power device of the power rail may be provided by rotating motor, as well as linear motor, in addition to contacting in attaching type, magnetic suspension also can be adopted, or other power methods known by those skilled in the art. When the power device adopts linear motor, induction plates of the linear motors are arranged uniformly or non-uniformly on the rail and vehicle frameworks, thus the power source is distributed and balanced.

The main rail may comprise a vehicle frame, the vehicle frame may comprise wheel set, vehicle framework and power device. The power rail is one of the forms, the rail, wheel set, vehicle framework and power device can be combined to form an integrated structure, a connecting device is arranged between the front and rear vehicle frameworks which connect with each other in series and cover the entire rail. In actual implement process, display forms of the power rail are various, various forms may be displayed according to different power source adopted and combination with different independent small compartment, the key feature is the rail carrying kinetic energy, its rail must operate in closed cycle or approximate closed cycle although there are discontinuities, it keeps operating at a constant speed, providing carrying mode to the independent small compartment. Such that the high energy consumption mode that the traditional subway must brake and start at every station is avoided, and the failure rate of the system is reduced greatly.

The closed cycle mode of the power rail may be a closed cycle up and down, as a preferable method, it may also be plane circular cycle, when the plane circular cycle is adopted, linear segments of both relative directions in the circular cycle may provide transport requirements back and forth required by the transport; cycle structure of the power rail may be integral single cycle mode; may also be segments cycle connected by bridge form, to achieve remote transport, the top rail is arranged above between the segment cycles, the independent small compartment changes rail to the top rail through the rail change connector, then falls on the main rail; or multiple segments cycle structure that multiple lines simultaneously operate; or multiple segments split type cycle structure; in this aspect there are various possible changes beyond the contents described in the text. The above are just a few non-limiting examples.

The operating compartments are independent small compartments, independent small compartments are placed at corresponding positions on power rail, independent small compartment is provided with double-seat front and back or single-seat or multiple-seat or pure cargo compartment, to provide freight service during the transport trough period. This arrangement ensures that passengers in same vehicle have a same destination, to maintain the possibility of realizing the non-stop purpose from the goal.

As a form of independent small compartment, driven wheels are arrange at front end and rear end of bottom of it; underbody is provided with front and rear grooves which may match with corresponding parts of the power rail to prevent left or right deviation; rear part is provided with fixing groove, after bounce device on the vehicle framework of the power rail is bounced to groove, immobility is realized, a rail change connector is arranged at top of the independent small compartment, walking wheels and steering wheels are arranged on the rail change connector, after the rail change connector lifts and butt joints with top rail in exit and entrance rail, the independent small compartment will escape from power rail, to complete rail change.

Change modes of rail change connector are various, may be lifting up, or jacking, or opening, or rotating, or other methods known by those skilled in the art, rail change is realized after matching with top rail.

Top rail is arranged in the exit and entrance rail, top rail may be opening type rail arranged directly above cross section of whole transit, or separation type rail arranged on top side, or integral non-opening type rail arranged directly above, under some conditions, the rails at both sides may also be used, any rail that locates at different dimension from the original rail may be arranged as top rail. In conclusion, various changes are possible, any equivalent change based on the present invention falls within the protection scope of the present invention, it should be understood that the top rail refers to the rail that realizes rail change through using rail locating at any different dimension. In one alternative preferable solution, the rail change connector protrudes, the height of the top rail is decreased to make the rail change connector may change rail without being lifted up.

In another alternative preferable solution, the rail change connector does not insert the top rail directly, instead inserts the connector of the intelligent driving device on the top rail, the rail change connector matches with the connector of the intelligent driving device on the top rail to realize rail change Said intelligent driving device comprising wheel groups and corresponding power device may bring the independent small compartment to the required zone along the top rail, under this condition, the walking wheels on the rail change connector on the independent small compartment are not necessary.

As another selection of top rail, lead rail is arranged at front end of top rail of entrance rail, the opening of the lead rail is obviously bigger than the top rail, rotating wheels and positioning wheels are arranged thereon, to assist the rail change connector to insert top rail better.

The operation method of the above high-carrying-capacity non-stop rail transit system is in detail:

signal control system in main rail announces signals of operating, station entrance, and station exit to independent small compartment, independent small compartment continues operating or exits or enters into station according to signals of signal control system;

operating method of main rail: power rail keeps operating at a constant speed, several independent small compartments are placed at corresponding positions on power rail according to demands and advance in same direction at same speed, there is no displacement between each other, such that distance between positions on power rail may be narrowed substantially, to achieve high density and provide high-carrying-capacity;

method of station entrance: independent small compartment which needs to enter station changes rail lifts up connector, rail change connector inserts top rail according to the lead of the lead rail at front end of top rail, fixing device on power rail is unlocked, independent small compartment is driven to station from entrance rail through top rail; independent small compartment which does not need to enter station does no change rail change connector and keeps advancing with power rail; independent small compartment driven to entrance rail gradually slows down by power system arranged on top rail and rail change connector, totally stops until unloading zone with leaf shape, then passenger gets off;

method of station exit: passenger gets on and sets a destination, independent small compartment enters into exit rail, independent small compartment gradually accelerates to same speed with power rail in exit rail, rear end of exit rail is parallel with power rail up and down, and locates directly above power rail, same speed means relative static, independent small compartment is placed at corresponding position on power rail from above, driven wheels at bottom butt joints with position on power rail, sensor on position of power rail is activated, and fixing device on power rail is activated to be lifted up, to lock independent small compartment and realize rail entrance.

As another selection solution of station exit and rail entrance, independent small compartment accelerates to same speed with power rail in top rail, rear end of top rail is left and right side parallel with power rail and slightly higher than power rail, independent small compartment is pushed to power rail by pushing device at corresponding location push. Modified examples of other similar solutions of rail entrance are all possible, any equivalent change based on the present invention falls within the protection scope of the present invention.

Method of signal control system of the high-carrying-capacity non-stop rail transit system is as follow:

A. at time of main rail operating: when independent small compartment is placed at corresponding position on power rail, sensor on position transmits a signal, fixing device on vehicle framework is activated to be lifted up, and inserts fixing groove at lower part of independent small compartment, to complete lock, independent small compartment is placed on power rail and advances at a constant speed;

B. at time of station entrance: when independent small compartment arrived at designated station, at N meters before station, fixed signal receiving and transmitting device in main rail announce signal of imminent station to intelligent system of independent small compartment, after intelligent system contrasts and recognizes as destination, it transmits instruction, reports to control mainframe of station and requires to enter station, after achieving admission rail change connector is changed, and locking structure in fixing groove at bottom is instructed to prepare to unlock, when rail change connector on compartment successfully inserts top rail of entrance rail along lead rail, locking device on power rail is opened, independent small compartment advances along top rail, gradually slows down by power system of top rail and rail change connector according to designed program, until being driven to unloading zone and still, to complete unloading, independent small compartment after unloading enters into loading zone according to instruction of station, and waits for passenger to get on;

C. at time of station exit: after passenger gets on, closes door, and inputs destination by swiping card, main control computer of departure zone instructs independent small compartment to turn into station exit operation mode: independent small compartment firstly enters into departure waiting zone; when departing, it is necessary for power rail of main rail to have a corresponding empty position, there is a sensor at every position, sensor does not transmit a signal when position has independent small compartment, and sensor will transmits information to rail side induction point arranged at side of main rail at the moment of passing corresponding place when there is no compartment, calculating method of induction point on power rail of main rail is according to time t required by independent small compartment in exit rail, multiplying said time t by speed of power rail to obtain distance Y, thus specific location point arranged at rail side in main rail is calculated, receiver directly connects with main control computer of departure zone, and transmits instruction to independent small compartment.

The present invention also includes a switch method of path transfer of the high-carrying-capacity non-stop rail transit system, comprising main operating rail, bifurcation rail and transfer subject, the bifurcation rail is arranged at different dimension from the main operating rail at switch point, main operating rail and bifurcation rail do not locate in same plane x-y, instead have different dimension difference in three dimensional space, then connecting device on transfer subject is used to connect bifurcation rail in different dimension to realize path transfer.

The connecting device directly connects with bifurcation rail.

The connecting device connects with connecting structure on bifurcation rail.

The bifurcation rail locates directly above the main operating rail as a whole or locates at top side of the main operating rail separately or located at both sides of the main operating rail separately.

The switch method is as follow: transfer subject which needs path switch lifts up connecting device at corresponding location before bifurcation port, when vehicle moves to bifurcation port, connecting device is connected to bifurcation rail, simultaneously, provisional fixing structure of transfer subject and main operating rail unlocks to complete separation, transfer subject will follow guide of bifurcation rail to complete path switch, and moves toward new direction; transfer subject which does not need path switch does not change connecting device, thus will not insert bifurcation rail, and vehicle will continue operating along main operating rail path.

An assistant entrance device is arranged at front end of the bifurcation rail, to provide deviation rectifying effect, opening of the assistant entrance device is bigger than bifurcation rail part, positioning wheels are arranged at access, to help connecting device having deviation realize deviation rectifying; assistant entrance device is also provided with leading wheels, leading wheels provide an in-torsion power, to help connecting device overcome friction when contacting with bifurcation rail, to reduce instability in connecting process, and realize rail entrance smoothly.

The switch method is as follow:

when transfer subject transfers path from main operating rail to bifurcation rail at bifurcation: prepositive rail side signal system before path transfer point will continue transmitting confirmation signal of said rail change address, control system in transfer subject does contrast after receiving signal, after confirming requirement of rail change, corresponding device is activated, making connecting device change, to ensure that connecting device corresponds to bifurcation rail, connecting device connects with assistant entrance device, deviation angle is rectified, and leading wheels transfers inward to overcome friction, connecting device of transfer subject enters into bifurcation rail through lead rail, locking structure of transfer subject and main operating rail unlocks, transfer subject is led by bifurcation rail, gradually lifts upward to escape from main operating rail, and operates at new path following with bifurcation rail, to realize path transfer;

when transfer subject transfers path from bifurcation rail to main operating rail at import port: before importing, control system carried by transfer subject needs to obtain confirmation of empty position signal of prepositive rail side, to confirm that there is safety space on main operating rail transfer subject is importing, transfer subject gradually advances from bifurcation rail to main operating rail, when bifurcation rail is parallel with main operating rail in up and down dimension, transfer subject lifts up connecting device, corresponding to lowering transfer subject, to fit with main operating rail, after escaping from rear end of bifurcation rail, following main operating rail to advance, to realize path transfer.

Said switch method of path transfer of the high-carrying-capacity non-stop rail transit system may be applied in transport field or entertainment device field or mobile mechanical field.

The advantages of the present invention lie in:

The carrying mode of the power rail and small compartment simultaneously realizes high density and high speed of small vehicle transport, realizing high-carrying-capacity under the condition of every passenger has a seat and non-stop purpose, and the stereo rail change mode solves the difficult problem of rail change in large network transport, and the exit and entrance rail communicates the main rail with off-line type station, to realize a larger coverage of trunk line transport.

In addition, the small compartment which needs to transfer can realize seamless transfer of "the passengers are not necessary to get off" through the exit and entrance rail and off-line type station.

In terms of construction cost, since the body volume of the small compartment in the high-carrying-capacity non-stop rail transit system is much smaller than traditional subway, as a result, the radius of the passage can be greatly reduced. Compared with the existing subway construction, the ratio of the cost of the tunnel and station project to the total investment is more than 60%, this improvement has obvious significance.

In the energy consumption, since the high-carrying-capacity non-stop rail transit system avoids the brake and start required by every station stop, the energy consumption is largely saved; and in the trough period of passenger flow, freight compartment has non-stop purpose also can be opened, and it is not necessary for person to follow, and both the security and the timeliness of the cargo are improved, therefore, the present invention has practical significance in reducing energy consumption.

In the figures: A1 and A2 represent that two directions of transmit demands are respectively met in the main rail.

100. main rail (power rail) 101. wheel set 102. vehicle framework 103. front and rear connecting device 105A. primary induction plate of the linear motor 105B. secondary induction plate of the linear motor 200. independent small compartment 201. driven wheel of the independent small compartment 202. front and rear groove 203. fixing groove 204. seat 210. rail change connector 211. traveling riwheel on the rail change connector 212 guide wheel on the rail change connector 213. rotating shaft of the connecting device 300. exit and entrance rail (top rail) 301. integral non-opening type rail in top rails 302. integral opening type rail in top rails 303. separation type rail in top rails 304. top rail with intelligent driving device 305. side rail in top rails 310. lead rail 311. positioning wheel on the lead rail 312. leading wheel on the lead rail 320. intelligent driving device on the top rail 321. walking wheel on the intelligent driving device 322. power device on the intelligent driving device 323. connector on the intelligent driving device 400. off-line type station 401. unloading zone with leaf shape of the off-line type station (402.)

Figure 6:
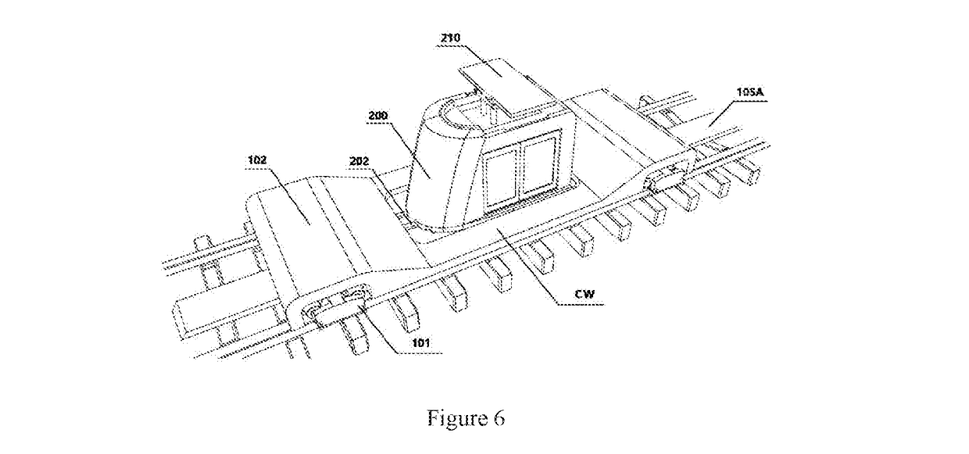
FIG. 6 is a schematic view of the independent small compartment placed on the power rail in the present invention.

500. electronic control system of the independent small compartment 600. rail side signal transmitter;

CW position KCW empty position MCW full position ZK central control system of the station X acceleration distance of the top rail portion Y distance at which the power rail shall transmit a signal in advance to ensure there is empty position when the small compartment enters the rail Va speed of the rear end of the exit rail Vb speed of the power rail FIG. 6 is designated as the drawing of the abstract of the present invention.

DETAILED DESCRIPTION OF THE EMBODIMENT

The present invention is further illustrated in combination with the drawings as flowing, this structure and principle of the system is very clear for those skilled in the art. It should be understood that the embodiments described here are only used to illustrate the present invention, but the present invention is not limited thereto.

The high-carrying-capacity non-stop rail transit system is a creative mode of city (including inter-city transport) public transport, said mode substantially improves the traditional subway operation mode, merges the advantage of high-carrying-capacity of the subway with the function of every passenger has a seat and non-stop purpose of the taxi, such that the future city transport could realize: the high-carrying-capacity of setting off once arriving, every passenger has a seat, and the non-stop purpose. The operation method of the high-carrying-capacity non-stop rail transit system could be operated on the underground tunnels, roads, elevated or connection passages between buildings or passages constructed through other modes or open platforms. The station could be arranged under the ground, on the roads, on the elevated platforms or the buildings according to demands.

Figure 1:
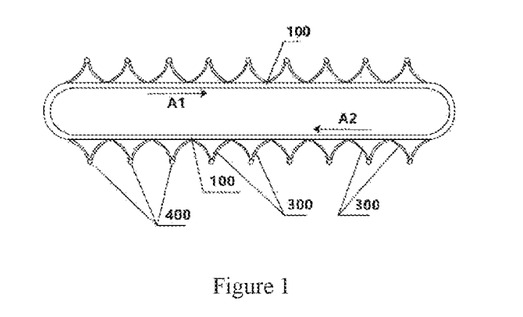
FIG. 1 is a schematic view of the broad framework of the present invention.

As shown in FIG. 1, a high-carrying-capacity non-stop rail transit system comprises a main rail, an exit and entrance rail, operating compartments, and a off-line type station, the operating compartments are independent small compartments, the main rail is power rail that keeps moving in cycle at a constant speed, the independent small compartments are placed at corresponding positions on the power rail, and the power rail drives the independent small compartments to advance at a constant speed; the off-line type station is connected to the main rail through the exit and entrance rail, a rail change connector is provided at the top of the independent small compartment, and the rail change connector and the exit and entrance rail are butt-joined to complete rail change.

Figure 2:
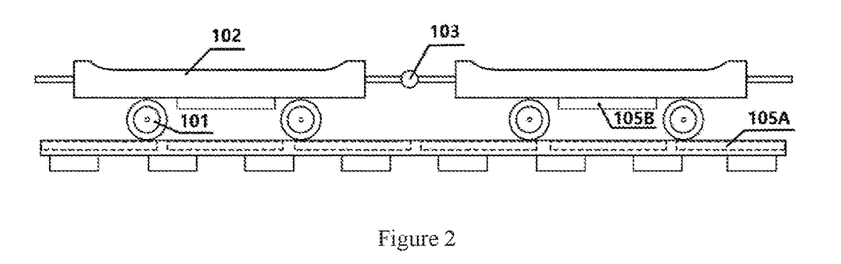
FIG. 2 is a partial schematic view of the power rail of the present invention.

The main rail may comprise a vehicle frame, the vehicle frame may comprise wheel set, vehicle framework and power device. As shown in FIG. 2, the rail kinetic energy could change the power system from vehicle carrying to rail carrying, the rail, wheel set, vehicle framework and power device can be combined to form an integrated structure, a connecting device is arranged between the front and rear vehicle frameworks which connect with each other in series and cover the entire rail. The entire rail operates in closed cycle and keeps operating at a constant speed, such that the high energy consumption mode that the traditional subway must brake and start at every station is avoided, and the failure rate of the system is reduced greatly.

As shown in FIG. 6, the kinetic energy is provided by the power rail, the independent small compartment is just placed on the power rail, therefore, during the whole operation process of the main rail, there is no relative displacement between the independent small compartments, such that safety accidents are reduced, and the distance between the compartment could be decreased greatly, thereby increasing the carrying-capacity substantially.

Figure 3:
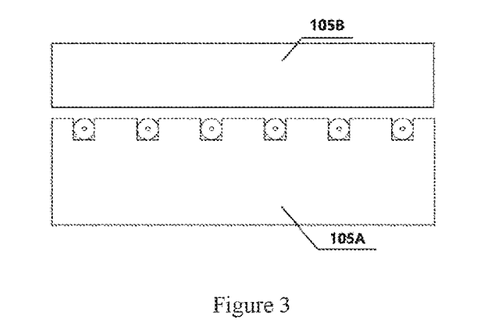
FIG. 3 is a schematic view of the induction plate when the power rail uses linear motor in the present invention.

As shown in FIGS. 2 and 3, the power system of the power rail may adopt a linear motor mode, primary induction plates are arranged on the rail, secondary induction plates are hung under the lower part of the vehicle frameworks, the primary induction plates on the rail power up, to produce power, and promote the power rail to operate. The primary induction plates of the linear motors are arranged uniformly or non-uniformly on the rail and vehicle frameworks, thus the power source of the power rail carried by the linear motor is distributed instead of centralized. According to the characters of the linear motor, its primary induction plate and secondary induction plate could be arrange at converse position.

The kinetic energy of the power rail may be provided by a rotating motor, which is similar to the combination of the rotating motor and the rail in traditional subway train.

Figure 4:
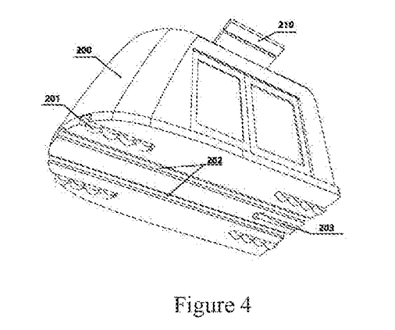
FIG. 4 is a schematic view from bottom of the independent small compartment in the present invention.
Figure 5:
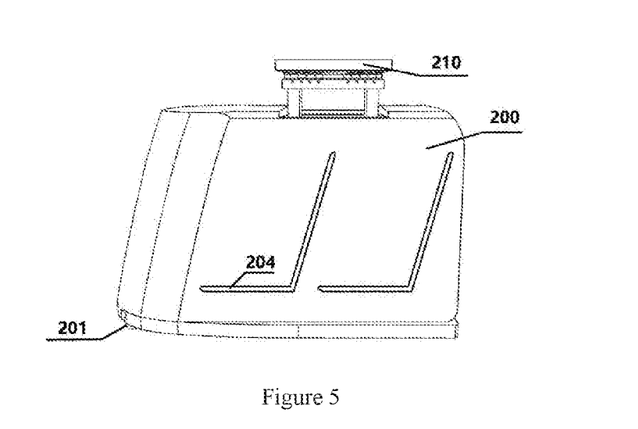
FIG. 5 is a side view of the independent small compartment in the present invention.

As shown in FIGS. 4, 5 and 6, the operating compartments are independent small compartments, the independent small compartments are placed at corresponding positions on the power rail; driven wheels are arrange at the front end and rear end of the bottom of the independent small compartment; the underbody is provided with front and rear grooves which may match with the corresponding parts of the power rail to prevent left or right deviation; the rear part is provided with fixing groove, after the bounce device on the vehicle framework of the power rail is bounced to the groove, the immobility is realized.

Double-seat front and back or side by side (or single-seat, four-seat, multiple-seat, or cargo compartment) is arranged in the independent small compartment, the passengers in the same compartment have a same destination, to maintain the possibility of realizing the non-stop purpose from the goal. A pure cargo compartment may provide city freight service during the transport trough period.

Figure 7:
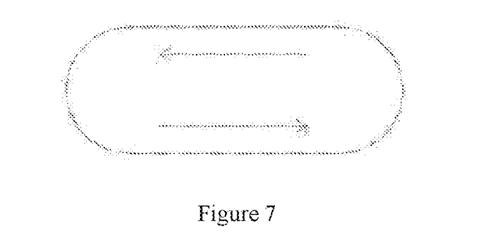
FIG. 7 is a schematic view of the power rail in an integral single cycle operation mode in the present invention.
Figure 8:
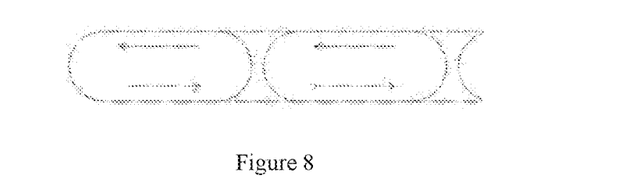
FIG. 8 is a schematic view of the power rail in segments cycle operation mode using bridge form in the present invention.
Figure 9:
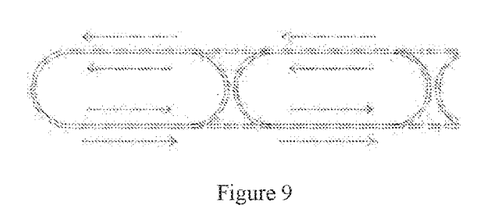
FIG. 9 is a schematic view of the power rail in multiple segments cycle mode in the present invention.
Figure 10:
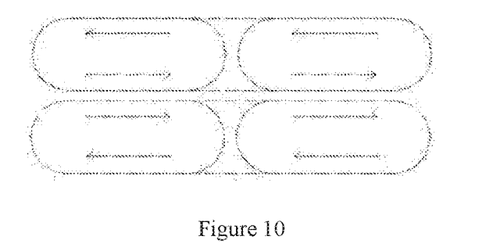
FIG. 10 is a schematic view of the power rail in cycle mode of multiple segments split type in the present invention.

As shown in FIG. 7, the power rail is a closed cycle endless rail, its cycle structure may be an integral single cycle mode according to the demands, as shown in FIG. 8, or segments cycle connected by bridge form, as shown in FIG. 9, or multiple segments cycle structure that multiple lines simultaneously operate; as shown in FIG. 10, the above multiple segments cycle may also adopt various structures, such as multiple segments split type. In the above cycle, when the independent small compartment needs to cross the bridge between two cycles, "stereo rail change mode" may be used to realize the movement from the former power rail cycle to the later power rail cycle, the top rail is arranged above between the segment cycles, the independent small compartment changes rail to the top rail through the rail change connector, then falls on the main rail. In details: a top rail is constructed over the space between two circles, the independent small compartment lifts up the rail change connector before the space between cycles, the rail change connector inserts the top rail, then the independent small compartment escapes from the original power rail cycle, and keep advancing with the top rail, to enter the next cycle. It should be pointed out that, the independent small compartment in the single direction on the power rail moves to the next cycle through the bridge, such that the reverse direction segment of said cycle is empty totally, thus it is not a difficult process that a new cycle accepts the independent small compartment from another power rail cycle through the bridge. The character of the stereo rail change lies in: at the switch point, i.e. the port of bifurcation rail, the bifurcation rail is arranged to locate in different dimensional space from the main operating rail, then the connecting device carried by the transfer subject is utilized, through the connecting device inserts, encloses, or attaches and connects with the bifurcation rail, the main operating rail switches to the bifurcation rail under the guide of the connecting device, to realize the switch of different paths. It should be noted that: the position of the connecting device on the transfer subject may be changeable, i.e. may be a position which does not corresponds to the bifurcation rail, or may be changed to a position corresponding to the bifurcation rail.

Figure 14:
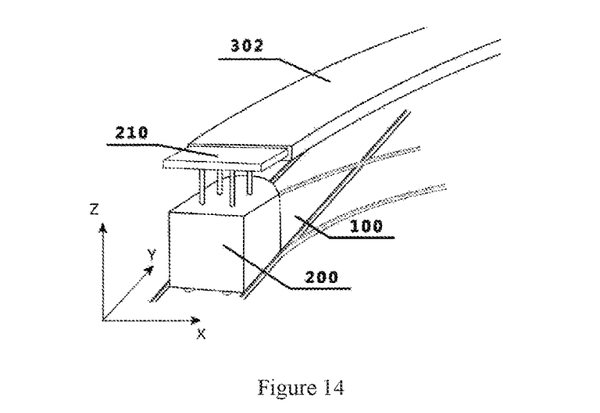
FIG. 14 is a schematic view of realizing the stereo rail change using the rails in different dimensions in the present invention

As shown in FIG. 14, a top rail which locates at different dimension from the original operating rail is used to realize fast stereo rail change.

Figure 15:
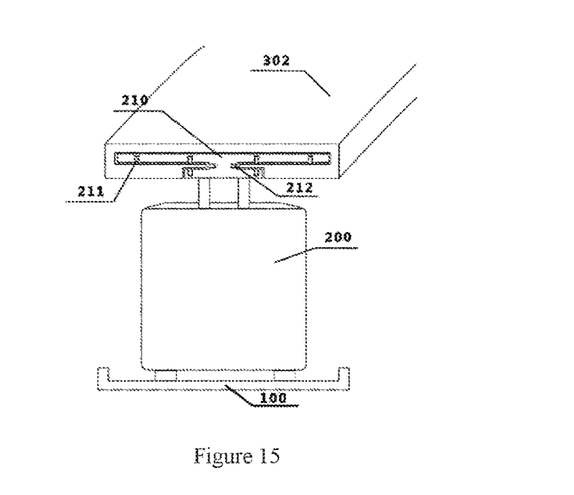
FIG. 15 is a schematic view of the moment that the rail change connector inserts the top rail in the present invention
Figure 16:
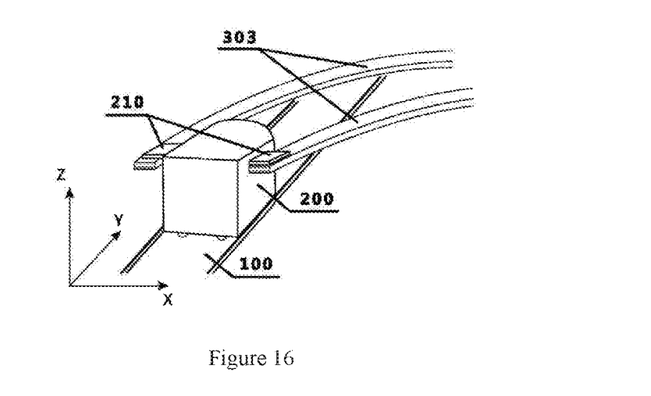
FIG. 16 is a schematic view of the rail change of the independent small compartment using separation type top rail in the present invention
Figure 17:
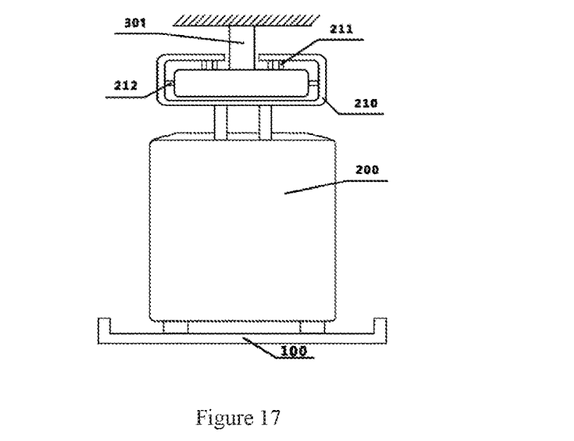
FIG. 17 is a schematic view of the independent small compartment entering into integral non-opening type top rail in the present invention

As shown in FIGS. 15, 16 and 17, various top rails may be arranged, it may be opening type rail that the rail is arranged directly above the cross section of the whole transit, it may be separation type rail which is arranged on top side, it may be integral non-opening type rail which is arranged directly above, under some conditions, the rails at both sides may also be used, it should be understood that the top rail refers to any rail that locates at different dimension from the original rail.

Figure 18:
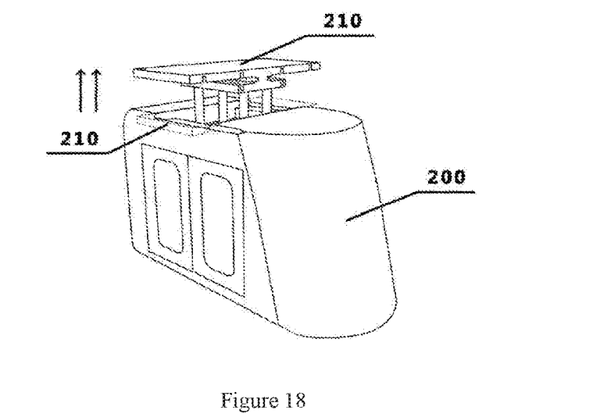
FIG. 18 is a schematic view of the lifting method of the rail change connector in the present invention
Figure 19:
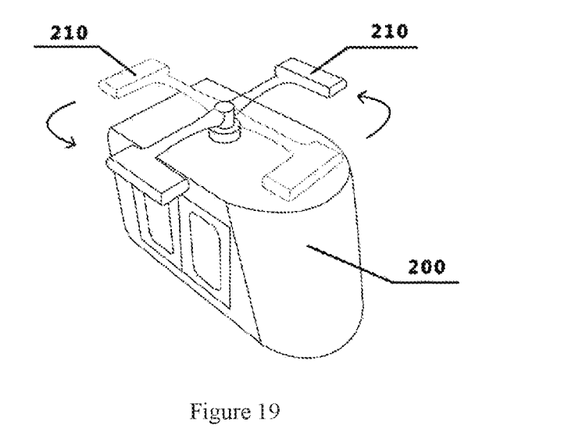
FIG. 19 is a schematic view of the rotating opening method of the rail change connector in the present invention

As shown in FIGS. 4 and 5, a changeable rail change connector is arranged at the top of the independent small compartment, walking wheels and steering wheels are arranged on the rail change connector; as shown in FIGS. 18 and 19, the change methods of the rail change connector is various, it may be uplifting, rotating, or other forms that known by those skilled in the art. In another embodiment, the rail change connector protrudes, the height of the top rail is decreased to make the rail change connector may change rail without being lifted up.

Figure 11:
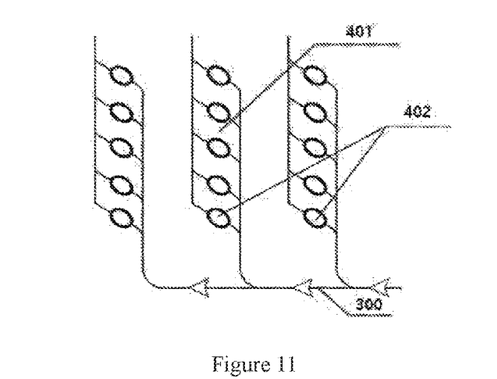
FIG. 11 is a schematic view of the unloading zone with leaf shape of the off-line type station in the present invention.
Figure 12:
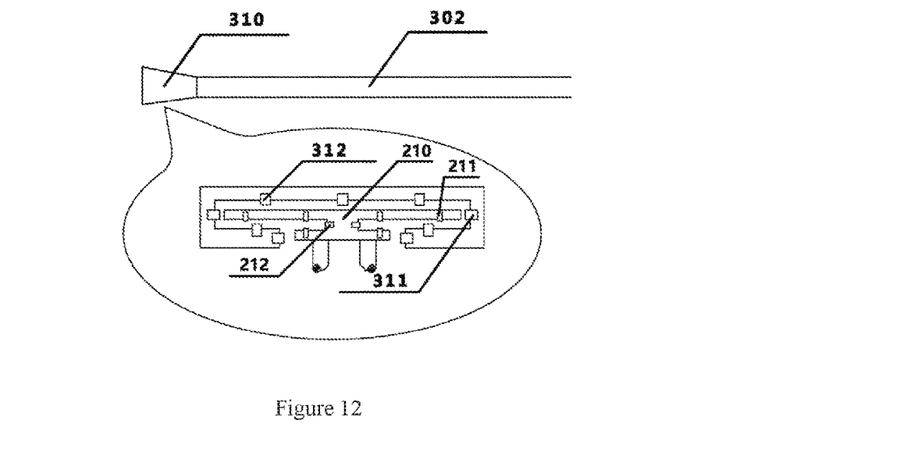
FIG. 12 is a schematic view of the rail change connector entering into the lead rail part of the top rail in the present invention

As shown in FIG. 1, the off-line type station communicates with the main rail through "exit and entrance rail", the independent small compartment which needs to enter the station gradually slows down from the entrance rail to the unloading zone with leaf shape of the off-line type station after the stereo rail change is realized by the top rail, the passengers leave after stopping, and the independent small compartment is deployed to loading zone in the station to provide new loading requirements. The unloading zone with leaf shape is shown in FIG. 11.

Figure 20:
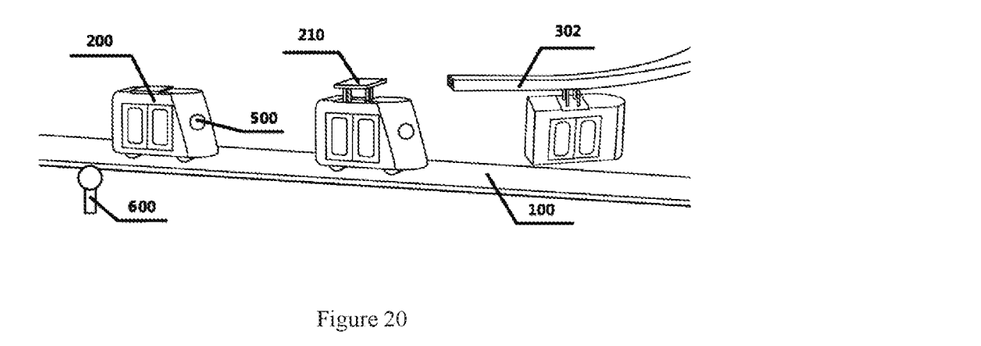
FIG. 20 is a schematic view of the stereo rail change in station entrance mode in the present invention

As shown in FIG. 20, the detailed mode of the entrance of the independent small compartment is as follows: before arriving at one station, the independent small compartment which needs to enter the station lifts up the rail change connector, and the independent small compartment which does not need to enter the station has no action, the uplifting rail change connector inserts lead rail at the front end of the top rail, several driving wheels are arranged around the lead rail, the wheel groups rotate inward, to help the rail change connector entry into the top rail from the lead rail smoothly, the independent small compartment operates with the top rail, and escapes from the power rail path, to realize the stereo rail change. Induction plate of the linear motor is arranged on the top rail as well as on the rail change connector, to provide power or resistance needed by the independent small compartment, to achieve the effects of deceleration, stationary and start, acceleration and so on. The independent small compartment operating on the entrance rail gradually slows down, and stops after entering into the unloading zone with leaf shape of the station, and the passengers get off and leave. The empty independent small compartment moves to the loading zone with leaf shape of the station, to provide new passengers to use.

Figure 22:
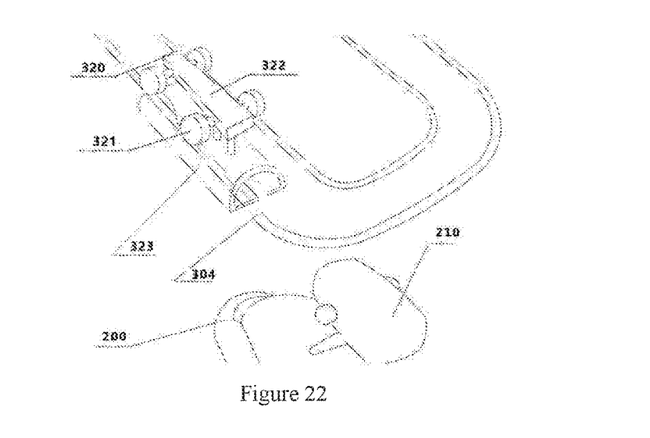
FIG. 22 is a schematic view of connecting the intelligent driving device in the stereo rail change in the present invention
Figure 23:
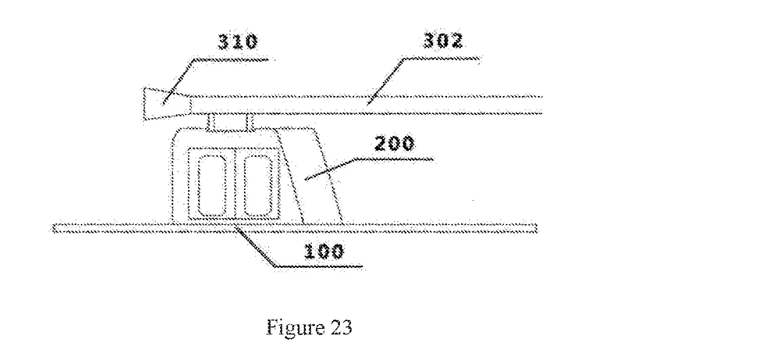
FIG. 23 is a side view of the connecting device of the transfer subject that connects with the bifurcation rail in the present invention.
Figure 24:
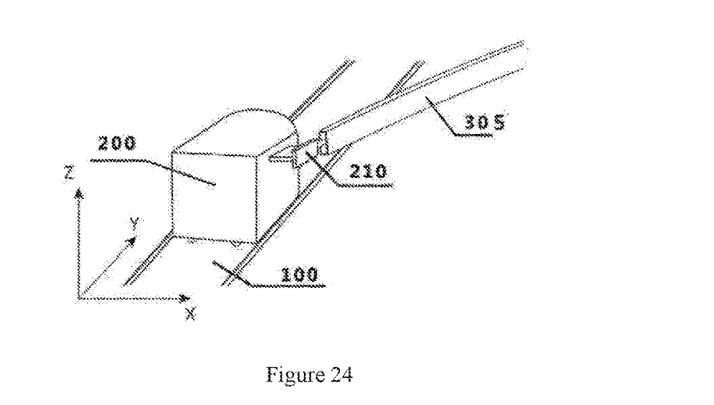
FIG. 24 is a schematic view of the bifurcation rail in side rail mode in the present invention.
Figure 25:
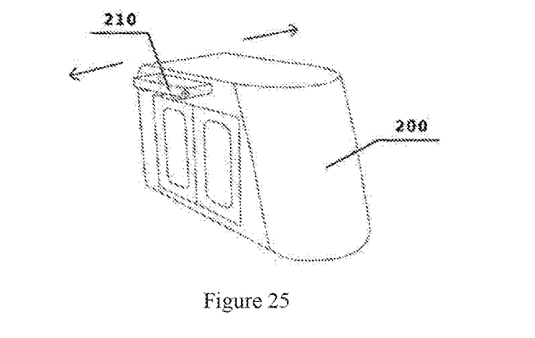
FIG. 25 is a schematic view of the connecting device expanding to both sides to change in the present invention.
Figure 26:
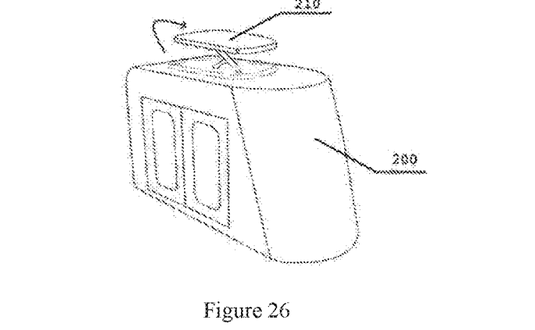
FIG. 26 is a schematic view of the connecting device locking to change in the present invention.
Figure 27:
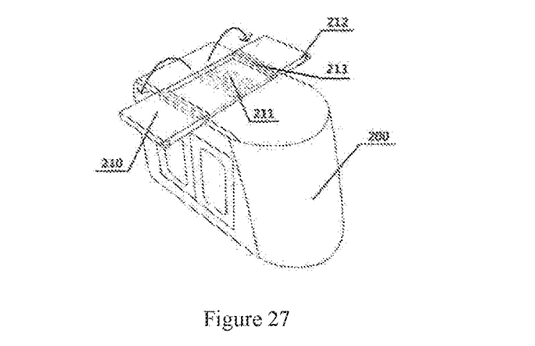
FIG. 27 is a schematic view of the connecting device opening to both sides to change in the present invention.

As shown in FIG. 22, in another alternative rail change solution, the rail change connector does not insert the top rail directly, instead inserts the connector of the intelligent driving device on the top rail, said intelligent driving device comprising wheel groups and corresponding power device may bring the independent small compartment to the required zone along the top rail, under this condition, the walking wheels on the rail change connector on the independent small compartment are not necessary.

Figure 21:
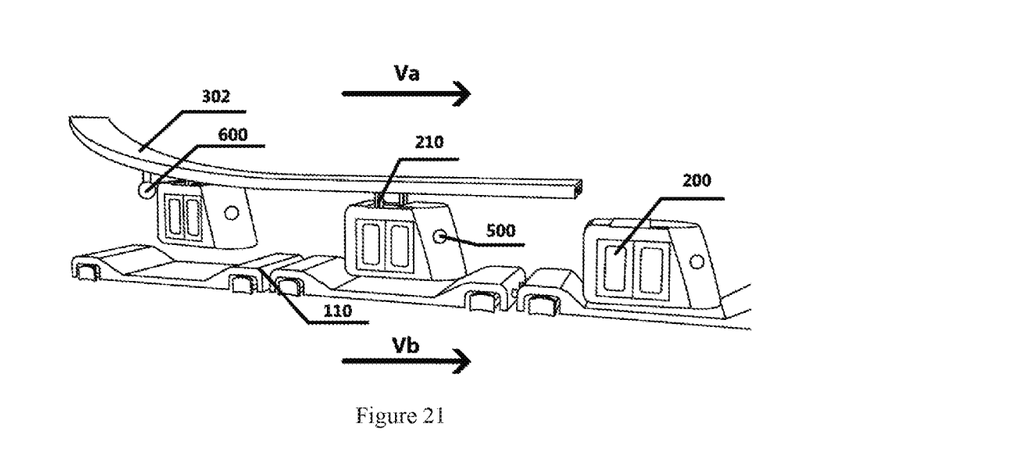
FIG. 21 is a schematic view of the stereo rail change in station exit mode under the condition of power rail in the present invention

As shown in FIG. 21, the detailed mode of the exit of the independent small compartment is as follows: the passenger gets on, and inputs corresponding destination, the independent small compartment will enter into a departure waiting zone, and the independent small compartment will enter into the exit rail when getting the departure instruction from the station, in the exit rail the speed of the independent small compartment is increased to be equal with the operating speed of the power rail through acceleration of the induction plates of the linear motor on the top rail, then the independent small compartment is placed on the power rail from above and advances with the power rail.

The station of the present high-carrying-capacity non-stop rail transit system is off-line type station, i.e. The station and the main rail are separated and connected by the exit and entrance rail, the off-line type station may be arranged according to demands, nearby sections of one same line may be provided with multiple off-line type stations according to demands, the station may be arranged according to demands based on one main line through off-line type station, the coverage of the station is much bigger, and the off-line type station could also be added after the basic construction is finished.

The value of stereo rail change is to be explained: for example, the speed of the power rail is designed as 75 kilometers per hour, i.e. about 21 meters per second, every independent small compartment has a length of 2.5 meters, the distance is 5 meters, that is to say there is a position in every 7.5 meters, then 21 meters per second corresponds to 3 compartments per second passing the rail change point. When the former compartment needs change rail, but the later compartment needs straight movement, the rail change system must ensure effective switch be completed within one third second, it is hard to implement by the prior rail change or transfer system, reconsideration in the present invention, in order to realize high-carrying-capacity, it is necessary to use rail kinetic energy and carrying mode, and the value of stereo rail change is reflected fully: the compartment which needs to keep operating does no lift up the "rail change connector", such that it won't be connected with the "top rail" and will keep advancing, the compartment which needs to exit lifts up the "rail change connector" in advance, to connect with the "top rail" and complete rail change. During the whole rail change process it is not necessary to switch back and forth like the rails in traditional mode, and there is no safety problem caused by unsuitable rail change, and it is one of the keys to realize high-carrying-capacity non-stop rail transit system.

Operating Method of the High-Carrying-Capacity Non-Stop Rail Transit System:

a. operating method of the main rail: the power rail keeps operating at a constant speed, several independent small compartments are placed at corresponding positions on the power rail according to demands and advance in same direction at the same speed, there is no displacement between each other, such that the distance between the positions on the power rail may be narrowed substantially, to achieve high density and provide high-carrying-capacity;

b. method of station entrance (away from the power rail): the independent small compartment which needs to enter the station lifts up the rail change connector, the rail change connector inserts the top rail according to the lead rail, the fixing device on the power rail is unlocked, the independent small compartment is driven to the station from the entrance rail through the top rail; the independent small compartment which does not need to enter the station does no lift up the rail change connector and keeps advancing with the power rail; the independent small compartment driven to the entrance rail gradually slows down by the power system arranged on the top rail and the rail change connector, and totally stops until the unloading zone with leaf shape, then the passenger gets off;

c. method of station exit (into the power rail): the passenger gets on and sets a destination, then the independent small compartment enters into the exit rail, and gradually accelerates to the same speed with the power rail in the exit rail, the rear end of the exit rail is parallel with the power rail, and locates above the power rail, same speed means relative static, the independent small compartment is placed at corresponding position on the power rail from above, the driven wheels at the bottom butt joints with the position on the power rail, sensor on the position of the power rail is activated, and the fixing device is activated to be lifted up, to lock the independent small compartment and realize the rail entrance.

Method of the Signal Control System:

A. At the time of the main rail operating: when the independent small compartment is placed at corresponding position on the power rail, the sensor on the position transmits a signal, the fixing device on the vehicle framework is activated to be lifted up, and inserts the fixing groove at lower part of the independent small compartment, to complete the lock. The independent small compartment is fixed on the power rail and advances at a constant speed.

B. At the time of station entrance: when the independent small compartment arrived at designated station, at N meters before the station (considering the time required by the signal transmission and lifting up the rail change connector) the fixed signal receiving and transmitting device in the tunnel of the main rail announce the signal of the imminent station to the intelligent system of the independent small compartment, after the intelligent system contrasts and recognizes as the destination, it reports to the control mainframe of the station and requires to enter the station. After achieving admission, the independent small compartment lifts up the rail change connector, and instructs the locking structure in the fixing groove at the bottom to prepare to unlock. When the rail change connector successfully inserts the top rail of the entrance rail along the lead rail, the locking device on the power rail is opened, the independent small compartment advances along the top rail because of inertia, gradually slows down by the power system of the top rail and the rail change connector according to designed program, and stops until being driven to unloading zone, to complete unloading. The independent small compartment after unloading enters into loading zone according to the instruction of the station, and waits for the passenger to get on.

Figure 13:
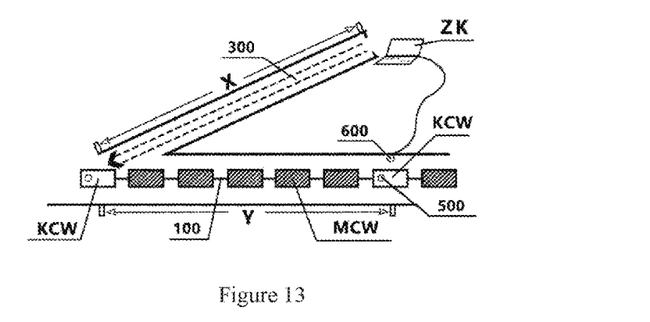
FIG. 13 is a schematic view of calculation of the rail side induction point in the present invention.

C. At the time of station exit: after the passenger gets on, the door is closed, the main control computer of departure zone instructs the independent small compartment to turn into station exit (rail entrance) operation mode: the independent small compartment firstly enters into the departure waiting zone; as shown in FIG. 13, when departing, it is necessary for the power rail of the main rail to have a corresponding empty position, there is a sensor at every position, the sensor does not transmit a signal when the position is a full position, and the sensor will transmits information to the rail side arranged at the side of the main rail when the position is an empty position, the receiver directly connects with the central empty system of the departure zone, and transmits an instruction to the independent small compartment, the independent small compartment enters into the empty position on the power rail just in time after acceleration. The calculating function of the rail side induction point is: the acceleration distance X of the exit rail is known, the time in the exit rail required by the independent small compartment is known, the distance Y is obtained through multiply said time by the speed of the power rail, the rail side signal receiver is arranged at the Y point.

The present invention also includes a stereo rail change method, the stereo rail change in the present invention is a creative technical method in the transport when path transfer is required, in said method the rail of the bifurcation path of transfer point is arranged at different dimension from the rail of main path, for example the main operating rail is bottom rail, the bifurcation rail is top rail, the front end of the bifurcation rail locates at different dimension from the main operating rail, but quite parts of them are parallel up and down, the connecting device on the transfer subject connects, such as inserts, encloses, or attaches with the bifurcation rail, the safety locking structure is unlocked if the transfer subject and the main operating rail have a safety locking structure, then the transfer subject escapes from the main operating rail and changes the direction following the gradual lifting of the bifurcation rail, to realize rail change.

The advantage of this stereo rail change lies in: even if the distance between the former and later transfer subjects is very close, the transfer subject is at high operating speed, rail change could be realized, and the vehicle having no need of rail change will not be influenced, each rail does not change during the rail change process, such that the risk generated by the instability of rail movement during the rail change process is substantially decreased.

Under some circumstances, in order to better continue decreasing the risk of stereo rail change, a certain assistant entrance device may be required to be arranged at the front end of the bifurcation rail, such as lead rail, to provide a certain deviation rectifying effect, in general, the opening of the lead rail part is obviously bigger than the lead rail part, positioning wheels may be arranged at the access, to help the connecting device having deviation realize deviation rectifying; leading wheels may provide a certain in-torsion power, to help the connecting device overcome the friction when contacting with the bifurcation rail, to reduce the connecting processes, such as instability of the entering or enclosing or attaching process, to realize rail entrance smoothly. The above circumstances may be set according to demands, and are not necessary.

The method of the above stereo rail change is in detail: when the transfer subject changes rail from the main operating rail to the bifurcation rail at the bifurcation: the prepositive rail side signal system before the bifurcation point will continue transmitting confirmation signal of said rail change address, the control system in the transfer subject does contrast after receiving the signal, after confirming the requirement of the rail change, the corresponding device is activated, making the connecting device change, such as lift, jack, rotate, extend, open and so on or making the transfer subject lift, to ensure that the connecting device corresponds to the bifurcation rail.

At the rail change moment: the connecting device connects with, such as inserts, encloses or attaches with the lead rail part, the deviation angle is rectified, and leading wheels transfers inward to overcome the friction, the connecting device of the transfer subject enters into the bifurcation rail through the lead rail, if the transfer subject and the main operating rail have a locking structure, unlocking said structure, the transfer subject is led by the bifurcation rail, gradually lifts upward to escape from the main operating rail, and operates at new path following with the bifurcation rail, to realize the rail change.

When the transfer subject changes rail from the bifurcation rail to the main operating rail at the import port: before importing, the control system carried by the transfer subject needs to obtain the confirmation of empty position signal of the prepositive rail side, to confirm that there is safety space on the main operating rail the transfer subject is importing, the transfer subject gradually advances from the bifurcation rail to the main operating rail, when the bifurcation rail is parallel with the main operating rail in up and down dimension, the transfer subject lifts up the connecting device, corresponding to lowering the transfer subject, to fit with the main operating rail, after escaping from the rear end of the bifurcation rail, following the main operating rail to advance, to realize the rail change.

The subject which changes moving path is usually the vehicle, may also be the other various types of tools which need to change path, hereafter referring vehicle. This kind of vehicle may be a single vehicle, or connection of multiple vehicles or other circumstances in the reality. Under the above circumstances, the vehicle may be provided with one or more connecting device. Under one general circumstance, when the main operating rail of the vehicle locates under the vehicle (bottom rail), the bifurcation rail may be arranged directly above or at top side of the vehicle (top rail), in order to simplify the illustration, in the following parts without specific illustration, the main operating rail is bottom rail, and the bifurcation rail is top rail.

Figure 28:
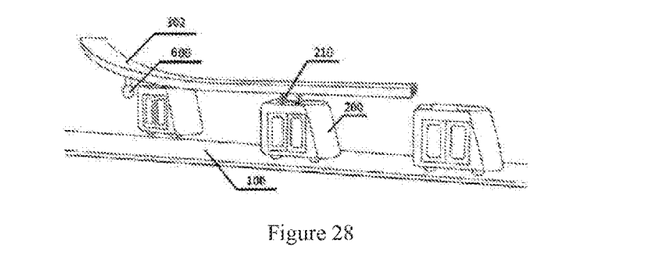
FIG. 28 is a view of three step states of the transfer subject when the transfer subject is at the import port to realize the stereo rail change in the present invention.

The present method is adaptable for the vehicle with forward kinetic energy, also adaptable for the other vehicles getting kinetic energy from external. For example, when the entire rail is in moving power rail form, the advancement of the vehicle is due to the vehicle framework placed on the power rail, the power rail keeps moving, when the vehicle which needs to change rail wants to import into the main operating rail from the bifurcation rail, since the main operating rail is power rail, the importing vehicle must keep the same speed with the power rail, when the transfer vehicle imports from the bifurcation rail to the main operating rail in power rail form, three step states of the transfer subject, wherein Va must equal to Vb, to exactly realize the rail change.

When the forward kinetic energy of the transfer subject is provided by the rail instead of carried by itself (this is a circumstance which is rarely adopt at present or not adopt so far but may be applied in the future, i.e. the power device and the vehicle framework are combined to form an integrity-power rail, the power rail runs through the entire rail, and the transfer subject may advance once placed on the power rail), in general situation, only the main operating rail is power rail, under the above situation, the rail change from the main operating rail having the power rail to the bifurcation rail having no power rail is similar to the normal rail change described above, but at the moment of the rail change (import) from the bifurcation rail to the main operating rail having the power rail, the speed of the transfer subject must be consistence with said power rail to realize effective rail change, due to the existence of the modern control system and signal system, the above conditions could be realized on basis of the conditions in the prior art.

The bifurcation rail may be integral, or separated, when said rail is different, it shall be connected with different connecting device, the stereo rail change may have more types of rail combination, and also have various types of connecting device to correspond, any equivalent change based on the present invention falls within the protection scope of the present invention.

The key of the stereo rail change lies in the bifurcation rail having different dimension arranged at the transfer place, the change from the bottom rail to the top rail exampled above is just one case of the stereo rail change, besides, it includes but is not limited to: from top rail to bottom rail, from bottom rail to side rail, from side rail to bottom rail, and various rail change modes of top side, bottom side and so on, any equivalent change based on the present invention falls within the protection scope of the present invention.

The transfer subject may only have one method of changing connecting device, may also have various methods to realize the correspondence of the connecting device and bifurcation rail, including but not being limited to: lift, jack, rotate, extend, open and various methods known by those skilled in the art. The connecting device of the transfer subject will prepare to match with the transferring rail through lifting method; the connecting device of the vehicle will prepare to match with the transferring rail through method of extending to both sides; the connecting device of the vehicle will prepare to match with the transferring rail through rotating method; the connecting device of the vehicle will prepare to match with the transferring rail through jacking method; the connecting device of the vehicle will prepare to match with the transferring rail through method of opening to both sides; to be known by those skilled in the art, various usable methods include various force method, may include magnetic force, air pressure, hydraulic pressure and other mechanical force.

The rail described in the present invention includes but is not limited to such as traditional steel rail and iron rail, also includes the other rail facilities formed by such as: alloy materials, steel materials, carbon fiber materials, cement materials, stone, mixed sand and so on that have the effect to carry and lead the vehicle forward, may be under the ground, on the road, elevated platform and other forms.

Although particular embodiments of the present invention have been shown described, it will be understood that other embodiments and modifications made by those skilled in the art fall within the true spirit and scope of the present invention as set forth in the attached claims. In fact, one or more features illustrated or described in combination with one embodiment may be combined with one or more features of other embodiments. Such modifications and variations are intended to be included within the scope of the present invention.

What is claimed is:

1. A high-carrying-capacity non-stop rail transit system, wherein, the high-carrying-capacity non-stop rail transit system comprises a main passage, a main rail arranged in the main passage, an exit and entrance passage, a station, and independent small compartments, wherein, the main rail is a power bottom rail, and the main rail includes a moving component configured to receive and support each independent small compartment from the exit and entrance passage while the moving component and the independent small compartment are moving and drive each independent small compartment to move, each of the independent small compartments is provided with a connecting device, the connecting device is a rail change connector, the exit and entrance passage is provided with a connecting structure, the connecting structure is a top rail, the top rail is an opening rail; the rail change connector on each independent small compartment is configured to move into a position to butt joint with the top rail to complete transfer and rail change of the independent small compartment between the main passage and the exit and entrance passage, wherein the moving component and the small compartment are configured without openings for establishing an interconnecting passageway capable of transferring one or more passengers and loads.

2. The high-carrying-capacity non-stop rail transit system of claim 1, wherein, the connecting structure is arranged at the exit and entrance passage, the rail change connector is arranged at upper end of each independent small compartment.

3. The high-carrying-capacity non-stop rail transit system of claim 1, wherein, the exit and entrance passage is provided with an exit and entrance rail.

4. The high-carrying-capacity non-stop rail transit system of claim 1, wherein, the station is an off-line station, the off-line station connected to the main rail through the exit and entrance passage.

5. The high-carrying-capacity non-stop rail transit system of claim 1, wherein, a rail, wheel sets, vehicle frames and a power device are combined to form an integrated structure which is the power rail, the moving component is formed with the wheel sets and the vehicle frames; front and rear connecting devices are arranged between adjacent vehicle frames which are connected with each other in series, to form a closed cycle system or an opened cycle system.

6. The high-carrying-capacity non-stop rail transit system of claim 5, wherein, the main rail further comprises a main operating rail and a bifurcation rail, each independent small compartment changes between the main operating rail and the bifurcation rail through the rail change connector.

7. The high-carrying-capacity non-stop rail transit system of claim 1, wherein, the main rail is an integral single cycle mode.

8. The high-carrying-capacity non-stop rail transit system of claim 1, wherein, the main rail comprises a plurality of segment cycles, the plurality of segment cycles are interconnected by a bridge form, the top rail is arranged above between the segment cycles, each independent small compartment is configured to change to the top rail through the rail change connector, then to fall on the main rail.

9. The high-carrying-capacity non-stop rail transit system of claim 1, wherein, the main rail is a multiple segments cycle system.

10. The high-carrying-capacity non-stop rail transit system of claim 5, wherein, the power device is a linear motor.

11. The high-carrying-capacity non-stop rail transit system of claim 10, wherein, linear motors are uniformly or non-uniformly distributed on entire rail and vehicle framework, to provide distributed balanced power source.

12. The high-carrying-capacity non-stop rail transit system of claim 1, wherein, kinetic energy of the power rail is provided by a rotating motor.

13. The high-carrying-capacity non-stop rail transit system of claim 5, wherein, wheel sets and the rail of the power rail are being associated with each other through contact or magnetic suspension.

14. The high-carrying-capacity non-stop rail transit system of claim 1, wherein, bottom of each of the independent small compartments is provided with grooves which match with corresponding parts of the main rail to prevent left or right deviation.

15. The high-carrying-capacity non-stop rail transit system of claim 1, wherein, walking wheels and steering wheels are arranged on the rail change connector.

16. The high-carrying-capacity non-stop rail transit system of claim 1, wherein, the rail change connector is configured to be lifted up and down to butt joint with top rail, and each independent small compartment is configured to escape from the main rail to complete rail change.

17. The high-carrying-capacity non-stop rail transit system of claim 2, wherein, the rail change connector is configured to rotate.

18. The high-carrying-capacity non-stop rail transit system of claim 1, wherein, the top rail is a side rail.

19. The high-carrying-capacity non-stop rail transit system of claim 1, wherein, the main rail comprises a plurality of positions, the positions are used to place each of the independent small compartments, respectively.

20. The high-carrying-capacity non-stop rail transit system of claim 19, wherein, a fixing device is arranged on each of the positions, bottom of each of the independent small compartments is provided with a fixing groove, and the fixing device matches with the fixing groove to lock each of the independent small compartments.

21. The high-carrying-capacity non-stop rail transit system of claim 1, wherein, power system is arranged on the rail change connector.

22. The high-carrying-capacity non-stop rail transit system of claim 1, wherein, a vehicle-mounted intelligent system is arranged in each independent small compartment.

23. The high-carrying-capacity non-stop rail transit system of claim 22, wherein, the high-carrying-capacity non-stop rail transit system further comprises a station control mainframe, the main rail is provided with a rail side signal transmitter, the vehicle-mounted intelligent system communicates with the station control mainframe, and the station control mainframe communicates with the rail side signal transmitter.

24. The high-carrying-capacity non-stop rail transit system of claim 6, wherein, the rail change connector is configured to match with a top rail through a lead rail; the bifurcation rail is provided with the lead rail to provide a deviation rectifying effect; positioning wheels are arranged at an access of the lead rail to help the rail change connector having deviation to realize deviation rectifying; the lead rail is provided with leading wheels; and the leading wheels is configured to provide an in-torsion power to help the rail change connector to overcome friction when contacting with the bifurcation rail.

25. A operation method of the high-carrying-capacity non-stop rail transit system according to claim 1, wherein, the operation method comprises a main rail operation step, a station entrance step and a station exit step, wherein,
the main rail operation step comprises: using the main rail to carry the independent small compartment and to drive the independent small compartment to move;
the station exit step comprises: positioning the rail change connector to enter the main passage from the exit and entrance passage through the connecting structure, and causing the independent small compartment to fall on the main rail; and
the station entrance step comprises: using the rail change connector to cause the independent small compartment to escape from the main rail, and entering the exit and entrance passage from the main passage through using the rail change structure.

26. The operation method of claim 25, wherein, the station exit step further comprises: making the independent small compartment to accelerate on the connecting structure to a speed equal to the speed of main rail, then falling on the main rail.

27. The operation method of claim 25, wherein, a power system is arranged on the rail change connector, the station entrance step further comprises: using the power system to gradually slow down the independent small compartment, and stop at an unloading zone.

28. The operation method of claim 25 further comprising a step of calculating an independent small compartment position by multiplying time and speed associated with an independent small compartment to produce distance Y for determining a location of the independent small compartment position.

29. The operation method of claim 28, wherein, the high-carrying-capacity non-stop rail transit system further comprises a station control mainframe, a vehicle-mounted intelligent system is arranged in the independent small compartment, the main rail is provided with a rail side signal transmitter, the vehicle-mounted intelligent system communicates with the station control mainframe, and the station entrance step further comprises: causing the rail side signal transmitter to announce a signal of imminent station to the vehicle-mounted intelligent system that is configured to recognize the imminent station as a destination and to transmit an instruction to the station control mainframe regarding entering the station.

30. The operation method of claim 25, wherein, the main rail further comprises a main operating rail and a bifurcation rail, the operation method further comprises a bifurcation and rail change step: using the rail change connector to move the independent small compartment between the main operating rail and the bifurcation rail.

31. The operation method of claim 30, wherein, the rail change connector is configured to match with the top rail through a lead rail, the bifurcation rail is provided with the lead rail, positioning wheels are arranged at an access of the lead rail, and the bifurcation and rail change step further comprises: using the positioning wheels to assist the rail change connector to align with the lead rail; and the lead rail is provided with leading wheels, the bifurcation and rail change step further comprises: using the leading wheels to provide an in-torsion power, to help the rail change connector to overcome friction when contacting with the bifurcation rail.

32. The high-carrying-capacity non-stop rail transit system of claim 4, wherein, the off-line station comprises an unloading zone with leaf shape and a loading zone with leaf shape.

33. The high-carrying-capacity non-stop rail transit system of claim 1, wherein, the rail change connector is configured to change to a position corresponding to the top rail, when advancing along the power rail, so as to enter and connect with the top rail to complete a rail change.

* * * * *